July 17, 1956  G. E. HENNING ET AL  2,754,542
APPARATUS FOR SIMULTANEOUSLY ADVANCING
AND MILLING PLASTIC COMPOUNDS
Filed May 28, 1952  3 Sheets-Sheet 1
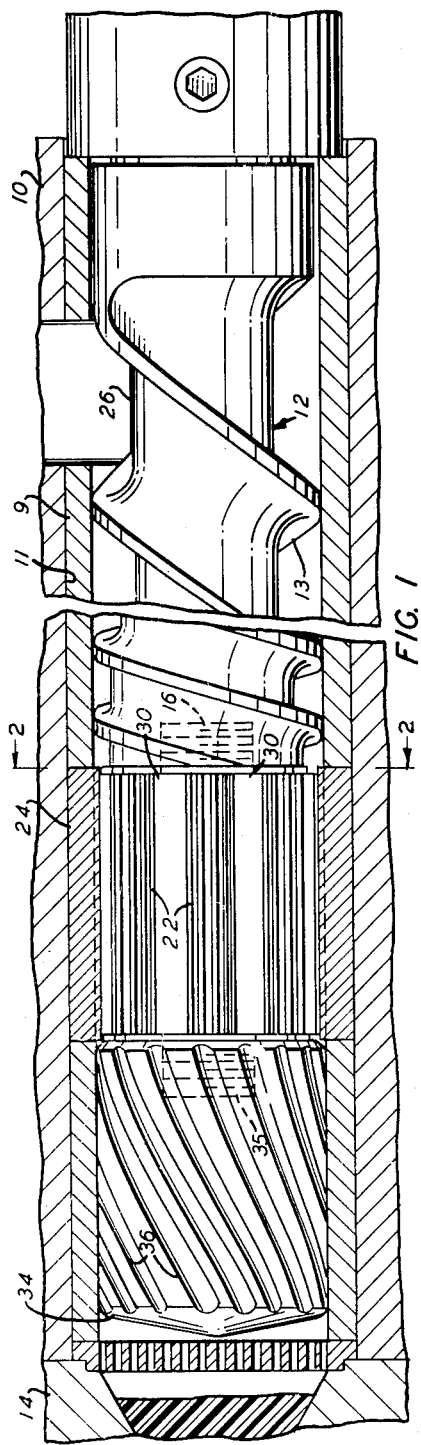
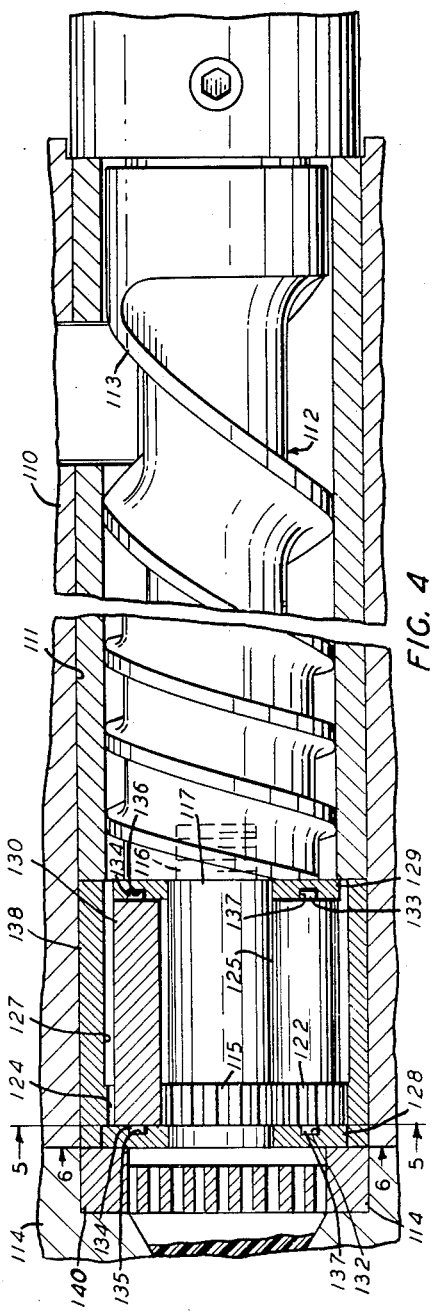
INVENTORS
G. E. HENNING
E. W. WEITZEL
BY
ATTORNEY INVENTORS
G. E. HENNING
E. W. WEITZEL
BY *[signature]*
ATTORNEY INVENTORS
G. E. HENNING
E. W. WEITZEL
BY *[signature]*
ATTORNEY

United States Patent Office 2,754,542
Patented July 17, 1956

2,754,542

APPARATUS FOR SIMULTANEOUSLY ADVANCING AND MILLING PLASTIC COMPOUNDS

George E. Henning, Baltimore, Md., and Edward W. Weitzel, Hickory, N. C., assignors to Western Electric Company, Incorporated, New York, N. Y., a corporation of New York Application May 28, 1952, Serial No. 290,505

7 Claims. (Cl. 18—12)

This invention relates to apparatus for simultaneously advancing and milling plastic compounds, and more particularly to apparatus for working thermoplastic compounds and extruding them into coverings around conductors.

An object of the invention is to provide new and improved apparatus for simultaneously advancing and plasticizing plastic compounds.

Another object of the invention is to provide new and improved apparatus for working and extruding thermoplastic compounds into coverings around conductors.

An apparatus illustrating certain features of the invention may include an extruding cylinder having a bore therein and a stock screw mounted rotatably in the bore. A plurality of rotatable compound working members positioned in the bore and driven by the stock screw coact with the screw, with the wall of the bore and with each other to mill a plastic compound advancing through the bore.

A complete understanding of the invention may be obtained from the following detailed description of apparatus forming specific embodiments thereof, when read in conjunction with the appended drawings, in which Fig. 1 is a fragmentary, vertical, longitudinal section of an apparatus forming a specific embodiment thereof;

Fig. 4 is a fragmentary, vertical, longitudinal section of an apparatus forming an alternative embodiment of the invention;

Figure 2:
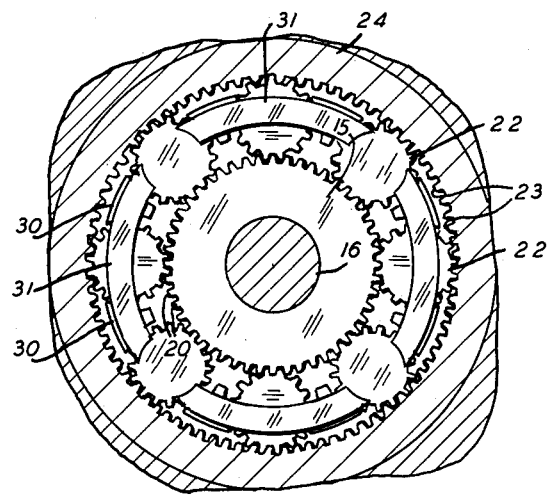
Fig. 2 is an enlarged, fragmentary, transverse, vertical, section taken along line 2—2 of Fig. 1.

Referring now in detail to the drawings, there is shown in Fig. 1 a liner 9 mounted in an extruding cylinder 10 and having a bore 11 therein. A stock screw 12 is mounted within the liner 9 for advancing a plastic compound from the right end of the stock screw 12, as viewed in Fig. 1, to an extruding head 14 at the left end of the cylinder. The stock screw 12 has a threaded portion 13, and an elongated sun gear 15 is connected rigidly to the left-hand end of the threaded portion 13 by means of a threaded boss 16. The gear 15 has gear teeth 20—20 meshing with teeth 21—21 of elongated planetary gears 22—22, which also mesh with teeth 23—23 of a long ring gear 24 positioned in the bore 11 and keyed to the cylinder 10.

The stock screw 12 is provided with a root 26 varying from a small diameter at the entrance end of the extruding cylinder 10 to a large diameter at the delivery end thereof so that a plastic compound advanced along the cylinder by the screw is compacted. As the screw rotates, it rotates the sun gear 15 therewith, which revolves the planetary gears 22—22 in the ring gear 24. The planetary gears 22—22 mesh loosely with the gears 15 and 24 so that the plastic compound may enter between the teeth, but they fit sufficiently closely with the gears 15 and 24 that they are revolved around the axis of the screw. Fillers 30—30 secured rigidly together in pairs by arcuate plates 31—31 overlapping adjacent planetary gears effectively fill the spaces between the gears 22—22 so that the compound is divided into a multitude of small streams as it is forced along this gearing. The plates 31—31 keep the fillers from jamming with the gears, which function is aided by rounded corners 32—32 of the spacers.

A tapered extension 34, secured rigidly to the sun gear by a threaded boss 35, is provided with rounded ribs 36—36. The planetary gears 22—22 are confined loosely between the extension 34 and the root 26 of the stock screw 12. The extension and the stock screw take thrust from the planetary gears through the arcuate plates 31—31.

Operation

The stock screw 12 is rotated in such a direction as to advance plastic compound introduced into the cylinder to the left, as viewed in Fig. 1, and the stock screw works the compound sufficiently to permit it to be severely worked and milled by the gears 15, 22—22 and 24 without scorching. The pressure exerted on the compound by the threaded portion of the screw 12 forces the compound along the gears.

As the screw 12 revolves, the sun gear 15 turns therewith and rotates the planetary gears 22—22 and revolves them about the longitudinal axis of the sun gear 15. The rotating gears 15, 22—22 and 24 mill and shear the compound as they mesh and squeeze the compound out of the gear teeth so that the compound is severely worked and mixed. The fillers 30—30 keep the compound in the gear teeth so that it does not slip past the gears without being worked. The fillers also provide arcuate surfaces near the gears, which together with the gears effect a milling action on the plastic compound.

The ribbed extension 34 then kneads and rolls the compound with a progressively increasing intensity. This brings the compound to a highly extrudable condition, and the compound is forced through the extruding head 14 in which a die (not shown) forms it into a covering on a core advanced through the extruding head.

First alternative embodiment

Figure 3:
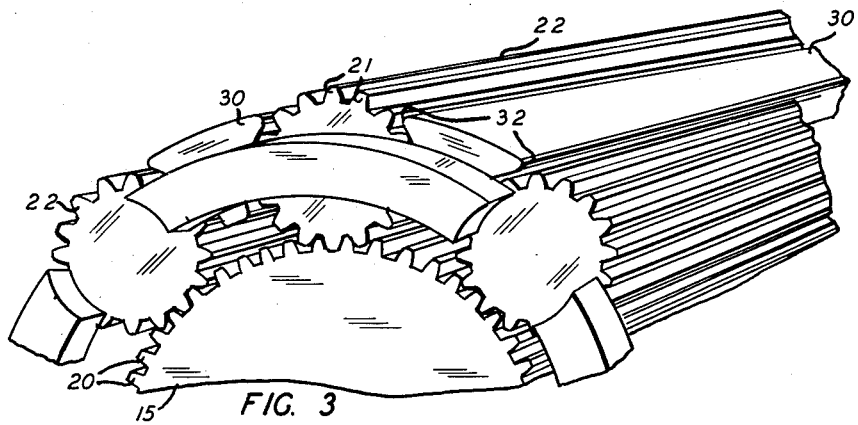
Fig. 3 is an enlarged, fragmentary, perspective view of the apparatus shown in Figs. 1 and 2.

In the alternative embodiment of the invention shown in Figs. 4 to 7, inclusive, an extruding cylinder 110 having a bore 111 therein has a stock screw 112 positioned therein for advancing a thermoplastic compound from the right end of the stock screw 112, as viewed in Fig. 3, to the left, or delivery, end of the cylinder where an extruding head 114 is mounted. The stock screw 112 has a threaded portion 113, and also is provided with a milling roll 117 secured to the screw by a threaded boss 116. A sun gear 115 secured rigidly to the milling roll meshes with planetary gears 122—122 secured rigidly to milling rolls 125—125. The gears 122—122 also mesh with teeth 123—123 of a ring gear 124 formed on a cylinder liner 138 keyed to the cylinder 110. The liner 138 is provided with a smooth milling surface 127.

Supporting rings 128 and 129 mount arbors 137—137, formed on the rolls 125—135, rotatably in sockets 132—132 and 133—133 formed in the rings 128 and 129, respectively. Pins 134—134, formed on fillers 130—130, fit tightly into sockets 135—135 formed in the ring 128 and sockets 136—136 formed in the ring 129 to hold the fillers 130—130 against movement relative to the rings 128 and 129. The rings 128 and 129 are mounted rotatably on the ends of the milling roll 117.

The ring 129 is limited in thrust by the end of the stock screw 112, and the ring 128 is similarly limited by a breaker plate 140 mounted in a socket 141 in the extruding head 114. The ring 129 has an outside diameter sufficiently less than the inside diameter of the liner 138 to permit the plastic compound to flow therebetween, and the ring 128 is provided with arcuate slots 142—142 (Fig. 6) through which the compound is forced.

The stock screw 112 is provided with a root 126 varying from a small diameter at the entrance end of the extruding cylinder 110 to a large diameter at the delivery end thereof so that a plastic compound advanced along the cylinder by the screw is compacted. As the screw is rotated, it rotates the sun gear 115, which, with the ring gear 124, rotates and revolves the planetary gears 122—122. The roll 117 and the rolls 125—125 are rotated simultaneously by the stock screw 112 and the gears 122—122.

Operation of first alternative embodiment

The stock screw 112 is rotated in such a direction as to advance thermoplastic compound introduced into the cylinder to the left, as viewed in Fig. 4, and the stock screw works the compound sufficiently that, as the compound reaches the delivery end of the stock screw, it may be severely worked without scorching. The action of the screw forces the compuond continuously between the ring 129 and the line 138, along the liner 138, the rolls 117 and 125—125 and the fillers 130—130, past the gears 115, 122—122 and 124, and through the arcuate slots 142—142, the breaker plate 140 and the extruding head 114, which forms the compound into finished article form.

As the screw 112 rotates, the sun gear 115 is rotated to revolve and rotate the gears 122—122 and the rolls 125—125. The rings 128 and 129 and the fillers 130—130 are carried with the gears 122—122 as the latter elements are revolved. The fillers 130—130 keep all the compound close to the liner 138 and the rolls 125—125. The portions of the rolls 125—125 adjacent to the milling roll 117, the fillers 130—130 and the milling surface 127 of the liner 138 are moved past these latter surfaces to mill the compound therewith.

Due to the differences in the sizes of the gears 115 and 122—122, there is a differential between the surface speed of the roll 117 and that of the rolls 125—125. The differential speed between these surfaces may be made to conform to desired milling practice by properly proportioning the gears, the rolls 117 and 125—125, and the liner 138. There are milling actions effected between the fillers 130—130 and the liner 138, between the rolls 125—125 and the liner 138, between the rolls 117 and 125—125, and between the rolls 125—125 and the fillers 130—130. The gears 122—122 shear the compound along with the gears 115 and 124. These working actions bring the compound to a highly extrudable condition, and the thus-conditioned compound is forced through the extruding head 114, where it is formed into a covering on a core advanced therethrough.

Second alternative embodiment

Figure 8:
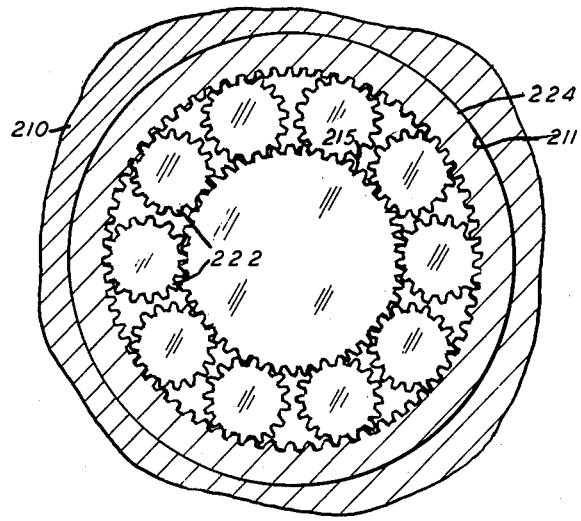
Fig. 8 is a fragmentary, vertical, transverse section of an apparatus forming another alternative embodiment of the invention.
Figure 5:
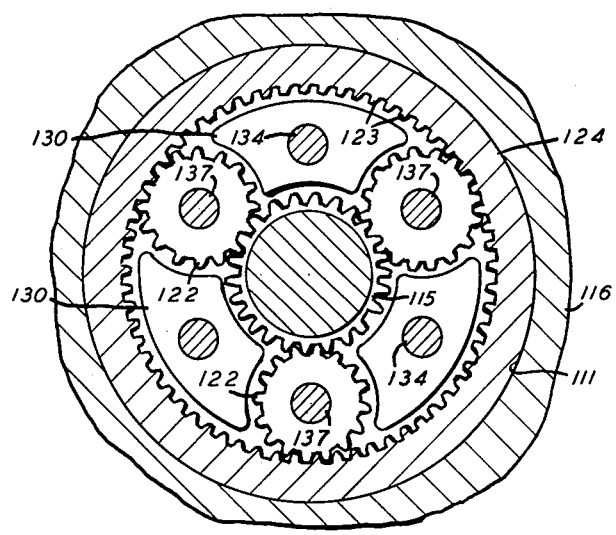
Fig. 5 is an enlarged, fragmentary, vertical, transverse section taken along line 5—5 of Fig. 4.

There is shown in Fig. 8 of the drawings still another embodiment of the invention which is, in general, similar to that shown in Figs. 4, 5, 6 and 7. However, in place of the roll 117 and the rolls 125—125 surrounding it that are present in the previously described embodiment, a series of elongated gears are utilized in the embodiment now being described.

Figure 7:
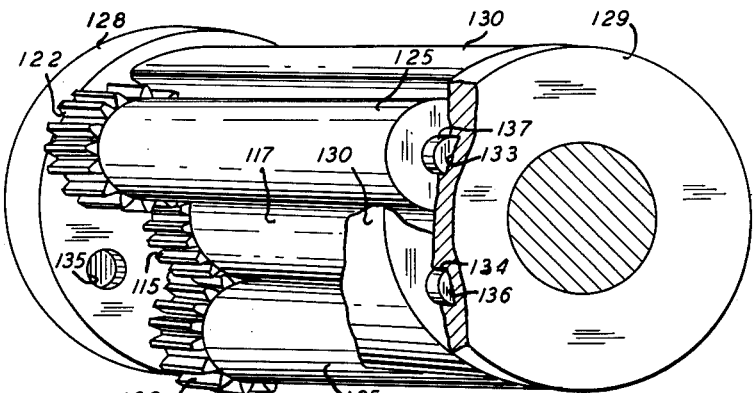
Fig. 7 is an enlarged, fragmentary, perspective view of the apparatus shown in Fig. 4.
Figure 6:
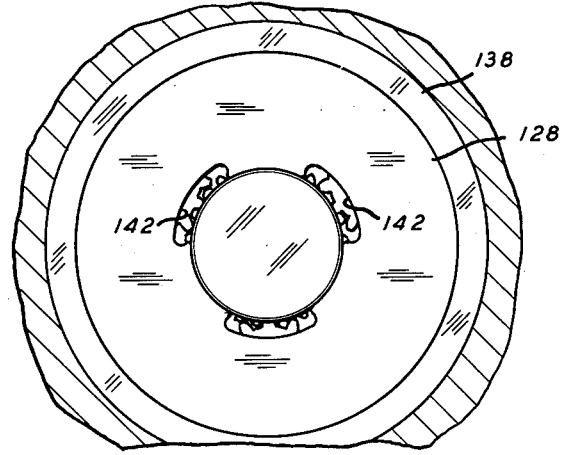
Fig. 6 is an enlarged, fragmentary, vertical, transverse section taken along line 6—6 of Fig. 4.

In this embodiment of the invention, there is provided an extrusion cylinder 210 having a bore 211 therein. An elongated ring gear 224 is positioned in the bore 211 adjacent to the delivery end of the extrusion cylinder 210. A stock screw, like the stock screw shown in Fig. 7, is positioned in the cylinder 210, and near the delivery end of the cylinder an elongated sun gear 215, which is similar to the sun gear 15 shown in Fig. 1, is attached to the stock schew. Positioned between the sun gear 215 and the ring gear 224 are a plurality of elongated planetary gears 222—222. The planetary gears 222—222 are of such size and are so spaced that, as they revolve, the teeth on each gear just barely miss those on the adjacent gears. As the sun gear 215 is rotated by the rotation of the stock screw, the planetary gears 222—222 are caused to revolve due to the engagement of those gears with the sun gear 215 and the ring gear 224.

In this embodiment of the invention, no spacers, retaining rings or retaining plates are provided. The gears 222—222 are held in place by their engagement with the stock screw at one of the ends thereof and by engagement with a breaker plate, similar to the breaker plate 140, at the opposite ends thereof.

Operation of second alternative embodiment

In the operation of this embodiment of the invention, a plastic compound is fed into the bore 211 in the extrusion cylinder 210 at the entrance end thereof, and the plastic material is forced towards the delivery end of the cylinder by means of the stock screw. Near the delivery end of the extrusion cylinder 210, the material encounters the revolving gears 215 and 222—222, and is worked and sheared between the teeth of the several gears 215, 222—222, and 224. During its passage between that portion of the extrusion cylinder 210, where the elongated gears are present, the material is thoroughly worked, milled and sheared so that it becomes suitable to be extruded into a covering on a core advancing through an extruding head associated with the extrusion cylinder 210.

The several above-described apparatus work and mix plastic compounds thoroughly and bring the compounds to uniform, highly extrudable condition just prior to the extrusion thereof. The several gears severely shear and work the compound, and the rolls 125—125 mill the compound intensely.

It is to be understood that the above-described arrangements are simply illustrative of the principles of the invention. Numerous other arrangements may be devised by those skilled in the art, which will embody the principles of the invention and wall within the spirit and scope thereof.

What is claimed is:

1. An extruder for working, advancing and extruding plastic material, which comprises an extruding cylinder provided with a longitudinally extending bore, at least a portion of the wall of said bore adjacent to the delivery end thereof being provided with internally directed gear teeth, a stock screw mounted rotatably in the bore for forcing a plastic mtaerial therealong, an elongated central milling member mounted for rotation with the stock screw concentrically within the bore, said milling member forming an extension of the stock screw and having a gear-toothed portion adjacent to the gear-toothed portion of the bore, and a plurality of elongated outer milling members opsitioned around the central milling member and provided with gear-toothed portions intermeshing with the gear-toothed portions of the central milling member and the wall of the bore, whereby when the stock screw is rotated the outer milling members are rotated about their own rotational axes and the rotational axis of the central milling member, the surfaces of the milling members cooperating with each other and with the wall of the bore to mill and shear the plastic material advanced along the bore by the stock screw.

2. An extruder for working, advancing and extruding plastic material, which comprises an elongated barrel having a longitudinally extending bore formed therein, a hollow cylindrical liner mounted in the bore adjacent to the delivery end thereof, at least a portion of the inner wall of said liner being provided with a plurality of internally directed gear teeth, a stock screw mounted rotatably within the bore in the barrel concentrically with respect to said liner, an elongated central milling member mounted for rotation with the stock screw concentrically with respect to the liner, said milling member forming an extension of the stock screw and having a gear-toothed portion adjacent to the gear-toothed portion of the liner, and a plurality of elongated outer milling members positioned around the central milling member and provided with gear-toothed portions intermeshing with like portions of the liner and of the central milling member, whereby when the stock screw is rotated the outer milling members are rotated about their own rotational axes and the rotational axis of the central milling member, the surfaces of the milling members cooperating with each other and with the wall of the liner to mill and shear the plastic material advanced along the bore by the stock screw.

3. An extruder, which comprises an extruding cylinder provided with a bore, an elongated portion of the wall of said bore adjacent to the delivery end thereof being provided with a plurality of internally directed gear teeth, a stock screw mounted rotatably in the bore, an elongated central milling member forming an extension of the stock screw and mounted concentrically within the bore adjacent to the gear-toothed portion thereof for rotation with the stock screw, the outer periphery of said central milling member being provided with a plurality of gear teeth extending along substantially the entire length thereof, and a plurality of elongated outer milling members positioned within the bore, the outer periphery of each of said outer milling members being provided with a plurality of gear teeth extending along substantially the entire lengths thereof designed for intermeshing cooperation with the gear teeth formed on the wall of the bore and the gear teeth on the central milling member, whereby said outer milling members are rotated and revolved as the stock screw is rotated, the surfaces of the milling members cooperating with each other and with the wall of the bore to mill and shear the plastic material advancing longitudinally through the bore.

4. An extruder for working, advancing and extruding plastic materials, which comprises an extruding cylinder provided with a longitudinally extending cylindrical bore therein, a ring gear provided with internally directed gear teeth positioned adjacent to the delivery end of the bore, a stock screw rotatably mounted within the bore for forcing a plastic material therealong, a cylindrical central milling roll extending from the delivery end of the stock screw and mounted concentrically within the bore for rotation with the stock screw, a sun gear mounted fixedly to the central milling roll and having outwardly directed gear teeth adjacent to the gear teeth of the ring gear, a plurality of planetary gears positioned in intermeshing cooperation with the ring gear and the sun gear, and a plurality of cylindrical planetary milling rolls, each of said rolls being secured to an associated planetary gear for rotation therewith, whereby when the stock screw is rotated the planetary milling rolls are rotated about their individual rotational axes and the rotational axis of the central milling roll and the surfaces of the rolls cooperate with each other and with the wall of the bore to mill and shear the plastic material advanced along the bore by the stock screw.

5. An extruder, which comprises an extruding cylinder provided with a bore therethrough of substantially uniform diameter along its entire length, an elongated portion of the wall of said bore adjacent to the delivery end thereof being provided with a plurality of internally directed gear teeth, a stock screw mounted rotatably in the bore, an elongated central milling member forming an extension of the stock screw and mounted concentrically within the bore adjacent to the gear-toothed portion thereof for rotation with the stock screw, the outer periphery of said central milling member being provided with a plurality of gear teeth extending along substantially the entire length thereof, a plurality of elongated planetary milling members positioned within the bore, the outer periphery of each of said planetary milling members being provided with a plurality of gear teeth extending along substantially the entire length thereof designed for intermeshing cooperation with the gear teeth formed in the wall of the bore and the gear teeth on the central milling member, whereby said planetary milling members are rotated and revolved as the stock screw is rotated, the surfaces of the milling members cooperating with each other and with the wall of the bore to mill and shear the plastic material advancing through the bore, and a plurality of fillers, each positioned between an adjacent pair of the planetary milling members for directing the plastic material toward the intermeshing gear teeth.

6. Apparatus for working, advancing and extruding plastic materials, which comprises an extruding cylinder provided with a longitudinally extending cylindrical bore therein, a ring gear provided with internally directed gear teeth positioned adjacent to the delivery end of the bore, a stock screw rotatably mounted within the bore for forcing a plastic material therealong, a cylindrical central milling roll extending from the delivery end of the stock screw and mounted concentrically within the bore for rotation with the stock screw, a sun gear mounted fixedly to the central milling roll and having outwardly directed gear teeth adjacent to the gear teeth of the ring gear, a plurality of planetary gears positioned in intermeshing cooperation with the ring gear and the sun gear, and a plurality of cylindrical planetary milling rolls, each of said rolls being secured to an associated planetary gear for rotation therewith, whereby when the stock screw is rotated the planetary milling rolls are rotated about their individual rotational axes and the rotational axis of the central milling roll and the surfaces of the rolls cooperate with each other and with the wall of the bore to mill and shear the plastic material advanced along the bore by the stock screw, a plurality of fillers positioned between adjacent planetary milling rolls, and a pair of spaced discs for journaling the planetary milling rolls and supporting the fillers between the planetary milling rolls.

7. Apparatus for working, advancing and extruding plastic material, which comprises an extruding cylinder provided with a cylindrical bore extending longitudinally therethrough, a portion of the wall of said bore adjacent to the delivery end thereof being provided with a plurality of internally directed gear teeth, a stock screw mounted rotatably in the bore for forcing a plastic material therealong, an elongated central milling member extending longitudinally from the delivery end of the screw and mounted for rotation therewith concentrically within the bore adjacent to the gear-toothed portion thereof, the outer periphery of said central milling member being provided with gear teeth extending along substantially the entire length thereof, a plurality of elongated planetary milling members positioned within the bore, surrounding the central milling member, the outer periphery of each of said planetary milling members being provided with gear teeth extending along substantially the entire length thereof designed for intermeshing cooperation with the gear teeth formed in the wall of the bore and the gear teeth on the central milling member, whereby when the stock screw is rotated the planetary milling members are rotated in an orbital path about their own rotational axes and the rotational axis of the central milling member, the surfaces of the milling members cooperating with each other and with the wall of the bore to mill and shear the plastic material advanced by the stock screw, and an extension mounted on the delivery end of the central milling member for rotation therewith and provided with a plurality of helical flutes, said extension fitting closely within the bore and being designed to knead and roll the advancing plastic material to bring it to a highly extrudable condition.

References Cited in the file of this patent

UNITED STATES PATENTS

| | | |
|---|---|---|
| 424,515 | Tregoning | Apr. 1, 1890 |
| 739,492 | Groves | Sept. 22, 1903 |
| 1,595,470 | Johnson | Aug. 10, 1926 |
| 1,656,164 | Bragard | Jan. 17, 1928 |
| 1,750,088 | Bragard | Mar. 11, 1930 |
| 2,055,956 | Wells | Sept. 29, 1936 |
| 2,092,628 | Allen | Sept. 7, 1937 |
| 2,333,885 | Poulter | Nov. 9, 1943 |
| 2,399,008 | Doran | Apr. 23, 1946 |
| 2,565,411 | Van Buuren | Aug. 21, 1951 |
| 2,573,440 | Henning | Oct. 30, 1951 |

FOREIGN PATENTS

| | | |
|---|---|---|
| 417,946 | Germany | Aug. 24, 1925 |